(12) United States Patent
Allen et al.

(10) Patent No.: US 8,186,561 B2
(45) Date of Patent: May 29, 2012

(54) SOLID STATE PROCESSING OF HAND-HELD KNIFE BLADES TO IMPROVE BLADE PERFORMANCE

(75) Inventors: Charles E. Allen, Denison, TX (US); Richard A. Flak, Provo, UT (US); Scott M. Packer, Alpine, UT (US); Russell J. Steel, Salem, UT (US); Hobie Smith, Houston, TX (US)

(73) Assignee: Megastir Technologies, LLC, Provo, UT (US)

( * ) Notice: Subject to any disclaimer, the term of this patent is extended or adjusted under 35 U.S.C. 154(b) by 626 days.

(21) Appl. No.: 11/090,909

(22) Filed: Mar. 24, 2005

(65) Prior Publication Data

US 2005/0252341 A1 Nov. 17, 2005

Related U.S. Application Data

(60) Provisional application No. 60/556,050, filed on Mar. 24, 2004, provisional application No. 60/573,707, filed on May 21, 2004, provisional application No. 60/637,223, filed on Dec. 17, 2004, provisional application No. 60/654,608, filed on Feb. 18, 2005.

(51) Int. Cl.
*B23K 31/02* (2006.01)
*B23K 20/12* (2006.01)
*B26B 9/00* (2006.01)
(52) U.S. Cl. ............ 228/2.1; 228/112.1; 30/147; 30/148
(58) Field of Classification Search .................. 228/2.1, 228/112.1; 30/148, 147
See application file for complete search history.

(56) References Cited

U.S. PATENT DOCUMENTS

| 4,144,110 | A | | 3/1979 | Luc |
| 5,028,386 | A | * | 7/1991 | Frommeyer ..................... 419/12 |
| 5,122,317 | A | * | 6/1992 | Chen et al. ..................... 264/651 |
| 5,460,317 | A | | 10/1995 | Thomas et al. |
| 5,611,479 | A | | 3/1997 | Rosen |
| 5,697,511 | A | | 12/1997 | Bampton |
| 5,697,544 | A | * | 12/1997 | Wykes ........................ 228/2.1 |
| 5,713,507 | A | | 2/1998 | Holt et al. |
| 5,718,366 | A | | 2/1998 | Colligan |
| 5,769,306 | A | | 6/1998 | Colligan |
| 5,794,835 | A | | 8/1998 | Colligan et al. |
| 5,811,755 | A | | 9/1998 | McGee et al. |
| 5,813,592 | A | | 9/1998 | Midling et al. |
| 5,829,664 | A | | 11/1998 | Spinella et al. |

(Continued)

FOREIGN PATENT DOCUMENTS

EP 0 797 043 A2 9/1997

(Continued)

OTHER PUBLICATIONS

Mishra, Rajiv S. "Friction Stir Processing for Superplasticity", Advanced Materials & Processes, Published Feb. 1, 2004, p. 45.*

*Primary Examiner* — Jessica L Ward
*Assistant Examiner* — Devang R Patel
(74) *Attorney, Agent, or Firm* — Morriss O'Bryant Compagni, P.C.

(57) ABSTRACT

A system and method for friction stir processing of a hand-held cutting edge, wherein friction stir processing techniques are used to modify the properties of the hand-held cutting edge to obtain superior edge retention and superior resistance to chipping of the hand-held cutting edge.

18 Claims, 12 Drawing Sheets

U.S. PATENT DOCUMENTS

| | | | |
|---|---|---|---|
| 5,971,247 | A | 10/1999 | Gentry |
| 5,971,252 | A | 10/1999 | Rosen et al. |
| 5,975,406 | A | 11/1999 | Mahoney et al. |
| 6,045,027 | A | 4/2000 | Rosen et al. |
| 6,045,028 | A | 4/2000 | Martin et al. |
| 6,050,474 | A | 4/2000 | Aota et al. |
| 6,050,475 | A | 4/2000 | Kinton et al. |
| 6,051,325 | A | 4/2000 | Talwar et al. |
| 6,053,391 | A | 4/2000 | Heideman et al. |
| 6,070,784 | A | 6/2000 | Holt et al. |
| 6,138,895 | A | 10/2000 | Oelgoetz et al. |
| 6,168,066 | B1 | 1/2001 | Arbegast |
| 6,168,067 | B1 | 1/2001 | Waldron et al. |
| 6,173,880 | B1 | 1/2001 | Ding et al. |
| 6,193,137 | B1 | 2/2001 | Ezumi et al. |
| 6,206,268 | B1 | 3/2001 | Mahoney |
| 6,372,012 | B1 * | 4/2002 | Majagi et al. ............... 75/236 |
| 6,543,671 | B2 * | 4/2003 | Hatten et al. ............ 228/112.1 |
| 6,655,575 | B2 * | 12/2003 | Mishra ..................... 228/112.1 |
| 7,225,969 | B2 * | 6/2007 | Chen et al. ............... 228/112.1 |
| 2002/0011509 | A1 * | 1/2002 | Nelson et al. ............ 228/112.1 |
| 2002/0079351 | A1 * | 6/2002 | Mishra et al. ............ 228/112.1 |
| 2004/0060965 | A1 * | 4/2004 | Mishra ..................... 228/112.1 |
| 2004/0134972 | A1 * | 7/2004 | Nelson et al. ............ 228/112.1 |
| 2005/0061853 | A1 * | 3/2005 | Packer et al. ............ 228/112.1 |
| 2005/0070374 | A1 * | 3/2005 | Mahoney .................... 473/349 |

FOREIGN PATENT DOCUMENTS

| | | |
|---|---|---|
| EP | 0 810 054 A1 | 12/1997 |
| EP | 0 833 097 A2 | 4/1998 |
| EP | 0 867 254 A1 | 9/1998 |
| EP | 0 810 056 A3 | 12/1998 |
| EP | 0 888 843 A1 | 1/1999 |
| EP | 0 893 189 A2 | 1/1999 |
| EP | 0 893 190 A2 | 1/1999 |
| EP | 0 925 964 A2 | 6/1999 |
| EP | 0 928 659 A1 | 7/1999 |
| EP | 0 947 280 A1 | 10/1999 |
| EP | 0 810 055 B1 | 12/1999 |
| EP | 0 968 788 A2 | 1/2000 |
| EP | 0 985 483 A2 | 3/2000 |
| EP | 0 992 314 A2 | 4/2000 |
| EP | 1 029 627 A1 | 8/2000 |
| EP | 1 046 453 A2 | 10/2000 |
| EP | 1 048 390 A2 | 11/2000 |
| EP | 1 055 478 A1 | 11/2000 |
| EP | 1 057 572 A2 | 12/2000 |
| EP | 1 057 573 A2 | 12/2000 |
| EP | 1 057 574 A2 | 12/2000 |
| EP | 1 057 575 A2 | 12/2000 |
| EP | 1 057 576 A2 | 12/2000 |
| GB | 2 306 366 A | 5/1997 |
| WO | WO 93/10935 | 6/1993 |
| WO | WO 97/15462 | 5/1997 |
| WO | WO 97/48517 | 12/1997 |
| WO | WO 98/13167 | 4/1998 |
| WO | WO 98/45080 | 10/1998 |
| WO | WO 98/51441 | 11/1998 |
| WO | WO 98/58759 | 12/1998 |
| WO | WO 99/32254 | 7/1999 |
| WO | WO 99/32255 | 7/1999 |
| WO | WO 99/33597 | 7/1999 |
| WO | WO 99/34951 | 7/1999 |
| WO | WO 99/39861 | 8/1999 |
| WO | WO 99/52669 | 10/1999 |
| WO | WO 99/54081 | 10/1999 |
| WO | WO 99/58288 | 11/1999 |
| WO | WO 99/65637 | 12/1999 |
| WO | WO 00/02698 | 1/2000 |
| WO | WO 00/02699 | 1/2000 |
| WO | WO 00/02704 | 1/2000 |
| WO | WO 00/03818 | 1/2000 |
| WO | WO 00/56497 | 9/2000 |

* cited by examiner

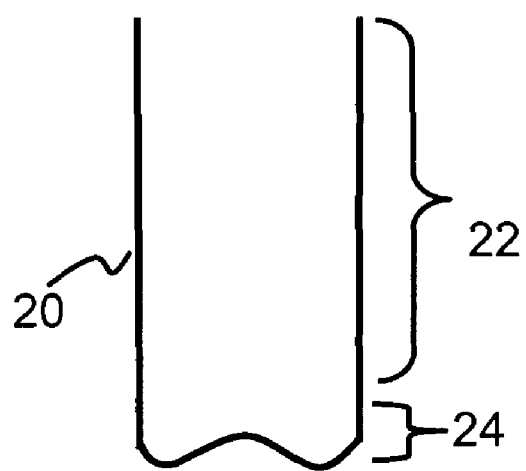
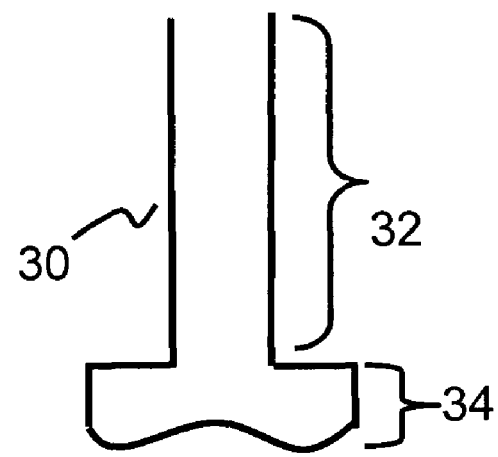
Figure 2   Figure 3

SOLID STATE PROCESSING OF HAND-HELD KNIFE BLADES TO IMPROVE BLADE PERFORMANCE

CROSS REFERENCE TO RELATED APPLICATIONS

This document claims priority to and incorporates by reference all of the subject matter included in the provisional patent application Ser. Nos. 60/556,050 filed Mar. 24, 2004, 60/573,707 filed May 21, 2004, 60/637,223 filed Dec. 17, 2004, and 60/654,608 filed Feb. 18, 2005.

BACKGROUND OF THE INVENTION

1. Field of the Invention

This invention relates generally to hand-held knives. More specifically, the invention relates to a method for improving characteristics of hand-held knife blades.

2. Description of Related Art

When discussing the present invention, the term "knife blade" or "blade" will be most often used to refer to cutting edges of hand-held instruments to which this invention is applicable. It should be understood that the present invention applies to any type of hand-held instrument having a cutting edge where sharpness, the ability to remain sharp, and resistance to chipping are important features of the hand-held cutting edge. Examples of applicable instruments include hunting knives, pocket knives, hatchets, cleavers, axes, scissors, box cutters, craft blades and the like.

Sharpness and the ability to retain a razor sharp edge are two important criteria for a hand-held knife blade. When hand-held knives are used to cut wire, bone, or any other hard or abrasive material, it is understood to be abuse. Abuse often results in the blade of the hand-held knife failing by becoming dull and/or developing chips. A hand-held blade that can withstand abuse and yet retain a sharp edge is a most desired characteristic that has long been sought after by those in the business of manufacturing hand-held knife blades. However, because impact resistance and toughness is inversely related to wear resistance and hardness for most hand-held blade materials, different hand-held knife blades are typically required for impact applications, such as chopping through bone and hard wood without chipping, and sharpness applications, such as cutting through animal flesh, and the like.

Certain products such as large cleavers and hatchets have been specifically designed to withstand the impact of cutting through hard dried wood and especially bone without the edge chipping. However, conventionally, increased impact toughness means lower RC hardness as compared to the higher RC values of other hand-held knife blades. As a result, the ability to maintain a sharp edge (referred to hereinafter as edge retention) is compromised. A technique has been developed to test several different types of steel at different "Rockwell" or RC hardness measurements until a happy medium is found between "good" edge retention, where there is no dulling of the blade, and the prevention of edge chipping.

For example, a conventional D2 steel hand-held cleaver, such as a Brown Bear™ Cleaver sold by Knives of Alaska, is designed to consistently cut through bone without chipping. However, when a rope is repeatedly cut with the hand-held cleaver, the edge retention is typically not up to par with harder hand-held knife blades, such as a Jaeger™ Boning knife also sold by Knives of Alaska. Similarly, harder hand-held knife blades that offer increased edge retention in low impact cutting applications typically experience edge chipping when used to cut or chop through harder material such as hard wood and bone due to the increased brittleness of the hand-held blade.

Ideally, a hand-held blade would be able to withstand abrasive cutting and retain a sharp edge, yet be able to withstand the high impact necessary to chop through solid bone, hard dried wood, etc., without the edge chipping or fracturing.

Accordingly, what is desired is a hand-held knife blade or cutting edge for a hand-held hatchet or other hand cutting instrument that can withstand the high impact of chopping or cutting through hard materials, and still provide superior edge retention.

BRIEF SUMMARY OF THE INVENTION

In one aspect, the present invention provides a method for enhancing the mechanical properties of a hand-held cutting edge.

In another aspect the present invention provides a hand-held cutting edge having superior edge retention and a method for forming the same.

In another aspect, the invention provides a method for forming a cutting edge on a hand-held knife that will result in superior resistance to chipping of the hand-held cutting edge.

In one embodiment, the present invention provides a system and method for friction stir processing of a hand-held cutting edge, wherein friction stir processing techniques are used to modify the properties of the hand-held cutting edge to thereby obtain superior edge retention and superior resistance to chipping of the hand-held cutting edge.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 2 is a cross-sectional view of another tool that can be used to perform the friction stir processing of the present invention.

FIG. 3 is a cross-sectional view of another tool that can be used to perform the friction stir processing of the present invention.

DETAILED DESCRIPTION OF THE INVENTION

Reference will now be made to the diagrams of the present invention in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

In one aspect, the present invention provides a system and method for performing friction stir processing on a hand-held cutting edge, also referred to as a "blade." Three blades processed using a friction stir processing system and method in accordance with the present invention were prepared and tested against conventional blades. The creation of the test blades was accomplished by friction stir processing a workpiece that was then finished to form a hand-held knife blade having a profile substantially identical to a conventional knife blade used for a comparison.

Another embodiment of the present invention is to use a tool as shown in FIG. 2. FIG. 2 is a cross-sectional view of a cylindrical friction stir processing tool 20. The friction stir processing tool 20 has a shank 22 and a shoulder 24, but no pin. Therefore, instead of plunging a pin into the material to be solid state processed, the shoulder is pressed against the material. Penetration by the shoulder is typically going to be restricted to the surface of the material or just below it because of the larger surface area of the shoulder as compared to the pin.

Figure 1:
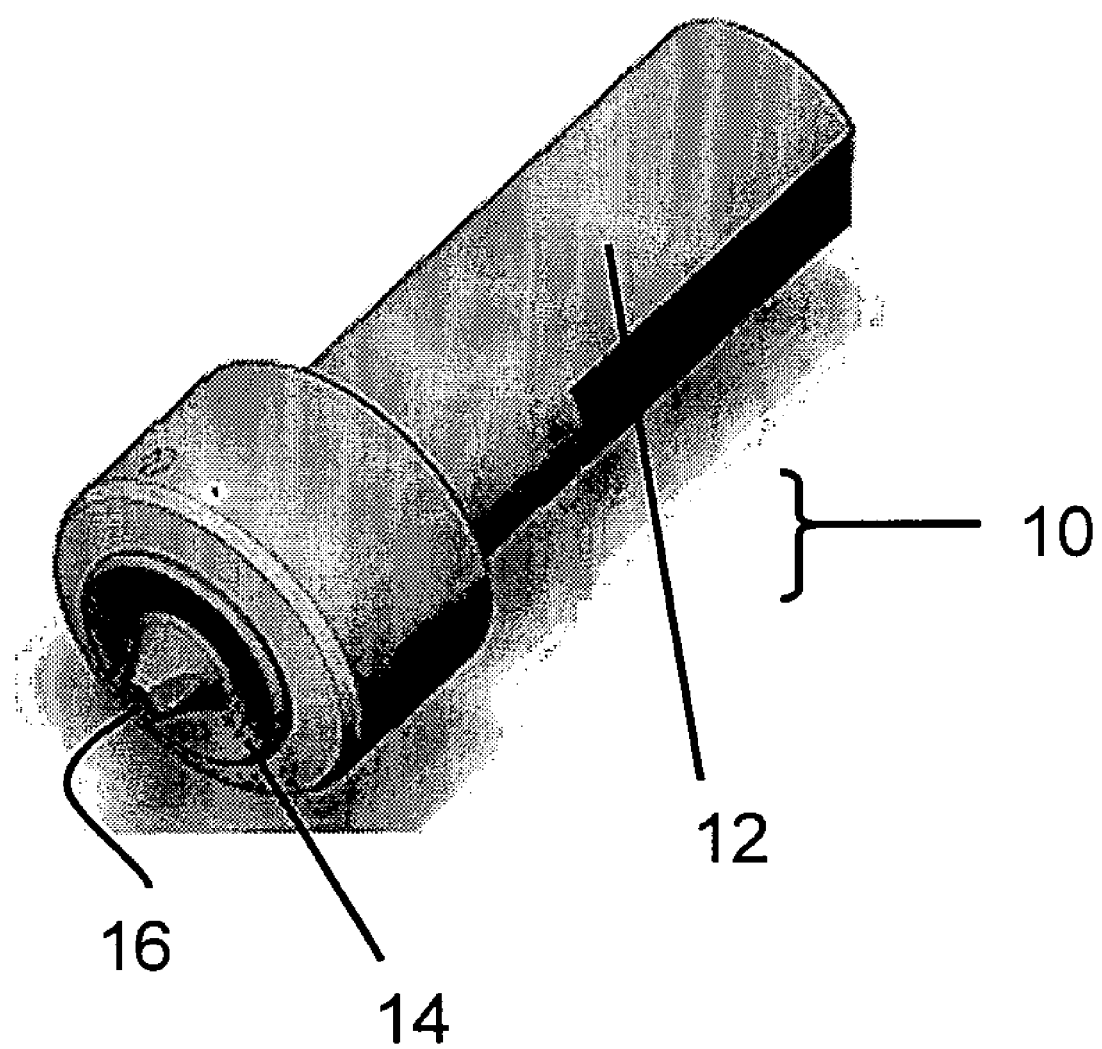
FIG. 1 is a perspective view of one tool that can be used to perform the friction stir processing of the present invention.

It should be noted that while the pin 16 of the tool 10 in FIG. 1 does not have to be plunged into the material, the pin is more likely to be designed for easy penetration. Thus, because the pin 16 is more likely to have a very small surface area as compared to the tool 20 of FIG. 2, the pin is more likely to plunge into the material. However, it may be advantageous to use the smaller surface area of the pin 16 for processing much smaller areas of a material, even just on the surface thereof. Therefore, it is another embodiment of the present invention that surface and near-surface processing can also be accomplished using a tool that is more typically used for penetration and joining of materials.

FIG. 3 is provided as an alternative embodiment for a tool having no pin. FIG. 3 shows a tool 30 having a shank 32 that is smaller in diameter than the shoulder 34. This design can be more economical because of less material used in its construction, depending upon the diameter of the shoulder 34.

It is important to recognize that nothing should be inferred from the shape of the shoulders 24 and 34 in FIGS. 2 and 3. The shoulders 24 and 34 are shown for illustration purposes only, and their exact cross-sectional shapes can be modified to achieve specific results.

Experimental results have demonstrated that the material to be used for the hand-held knife blade may undergo several important changes during friction stir processing. These changes may include, but should not be considered limited to, the following: microstructure, macrostructure, toughness, hardness, grain boundaries, grain size, the distribution of phases, ductility, superplasticity, change in nucleation site densities, compressibility, expandability, coefficient of friction, abrasion resistance, corrosion resistance, fatigue resistance, magnetic properties, strength, radiation absorption, and thermal conductivity.

Regarding nucleation, observations indicate that there may be more nucleation sites in the processed material due to the energy induced into the material from friction stir processing. Accordingly, more of the solute material may be able to come out of solution or precipitate to form higher densities of precipitates or second phases.

Figure 4:
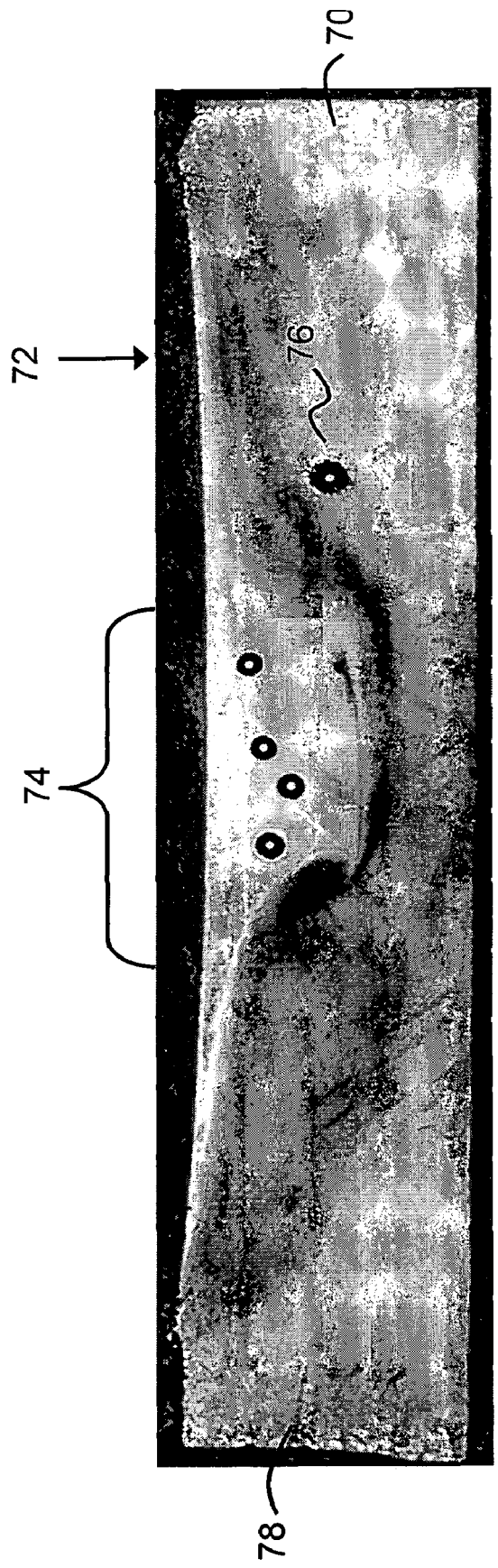
FIG. 4 is a cross-sectional view of a material that is friction stir processed to modify the characteristics of the material.

In FIG. 4, a section of ATS 34 steel was friction stir processed by plunging a tool similar to the tool shown in FIG. 2 into the base material 70 and moving the tool transversely along a middle length thereof. Transverse movement would be perpendicular to the page, thus FIG. 5 is a cross-sectional view of the base material 70.

FIG. 4 shows that the tool plunged into the base material 70 from the top 72. Several areas appearing as small circles are shown as having been tested for hardness relative to the Rockwell scale in the various zones of the base material. The stir zone 74 is shown having a hardness of 60 RC. Close to the boundary of the inner TMAZ (thermally mechanically affected zone) and the outer HAZ (heat affected zone) the base material 70 is shown as having a hardness value of 44 RC at a location 76. Finally, an unprocessed or original base material zone is shown as having retained, in other samples, its original hardness value of 12 RC at approximately location 78.

Figure 5:
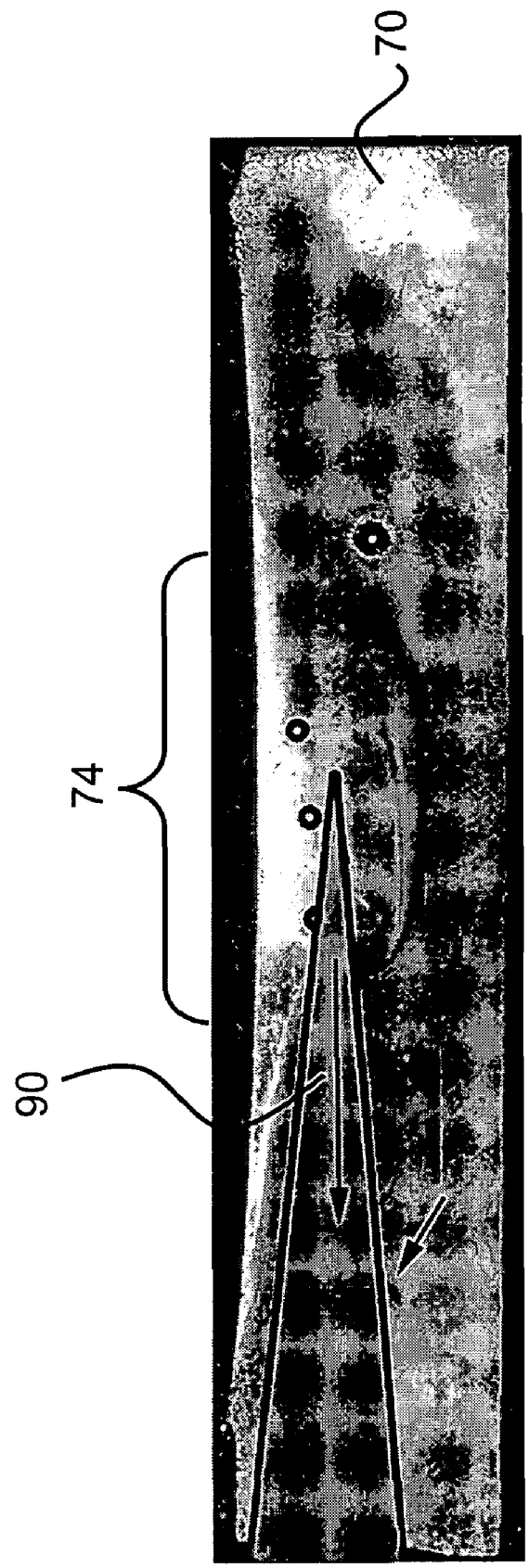
FIG. 5 is a cross-sectional view of a material that is friction stir processed to modify the characteristics of the material, and having an overlay identifying where a cutting edge could be formed from the friction stir processed material.

FIG. 5 is an illustration of an overlay 90 of a cutting edge on the ATS-34 steel base material 70. The overlay 90 indicates one advantageous configuration of a cutting edge that could be machined from the material 70, wherein the configuration takes the greatest advantage of the improved toughness and hardness characteristics of the friction stir processed material 70. Note that the cutting edge overlay 90 is formed in the processed region 74 that will result in a hard and yet tough cutting edge. Likewise, any object being formed from a processed material can be arranged to provide the most advantageous properties where it is most critical for the object. In this example, a beneficial cutting edge will be achieved from having an edge disposed well within the processed material.

Figure 11:
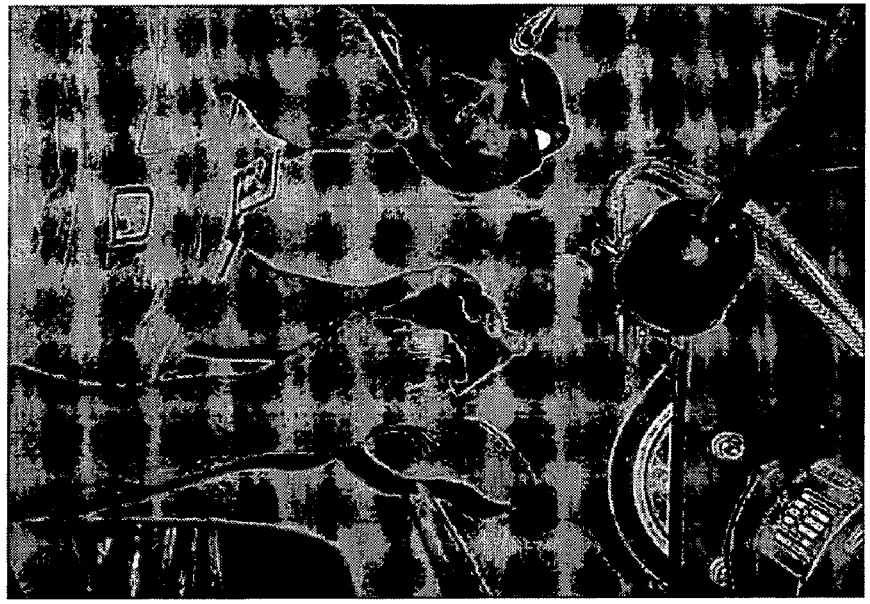
FIG. 11 is a view of a grinding machine with mist coolant, getting ready to grind the first hand-held test blade.

The hand-held test blades of the present invention were created by machining the hand-held test blades in accordance with the following instructions. FIG. 11 illustrates the grinding machine that was used to grind the hand-held test blades to the desired shape. The first attempt at grinding was to obtain a 22 degree angle with a 600 grit diamond belt. The result was a polished edge. A 320 diamond grit was then used with good results to further refine the hand-held blade. The desired angle was established and after a few passes, the cutting edge was placed against the 600 grit diamond belt to establish the desired wire "burr". The wire burr was removed with an 8,000 grit diamond belt and then polished with a 50,000 grit diamond belt. A razor "shaving" edge was established on the test blades and the cutting edge appeared to remain totally within the processed material.

It should be noted that the instructions provided above are only to create test blades that are comparable in sharpness to the blades that are being used for comparison purposes. A hand-held blade that can be created using the friction stir processing of the present invention should not be considered to be limited to the parameters stated above.

An important element of the present invention is also the concept of friction stir mixing. Whereas friction stir processing will be regarding as the processing of a single material that is to be fashioned into a hand-held blade, friction stir mixing provides for additional additive materials to be included in the friction stir mixing process. The additive materials become an integral part of the resulting hand-held test blades.

Figure 6:
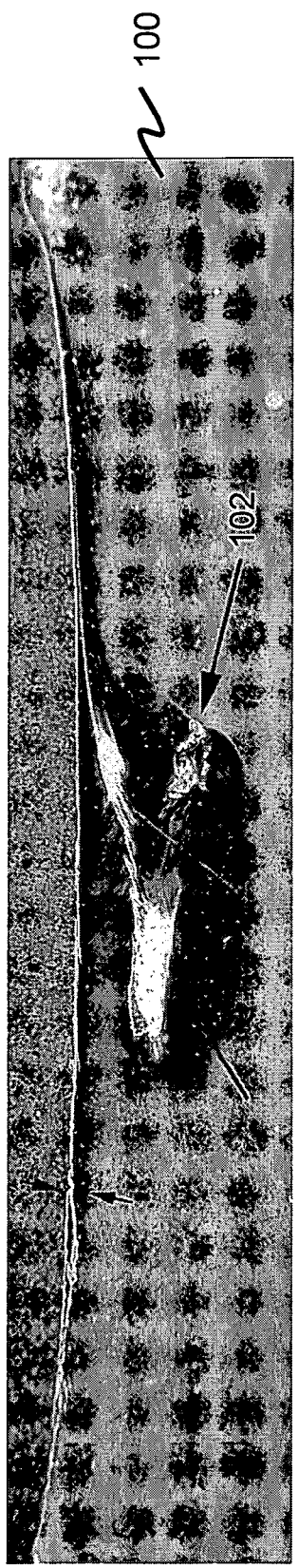
FIG. 6 is a cross-sectional view of material that has been friction stir mixed so as to include another material.

FIG. 6 is a cross-sectional view of a base material that has been friction stir mixed so as to include another additive material. Specifically, a steel member 100 has been friction stir mixed so as to work in diamond particles 102 into the steel member.

Figure 7:
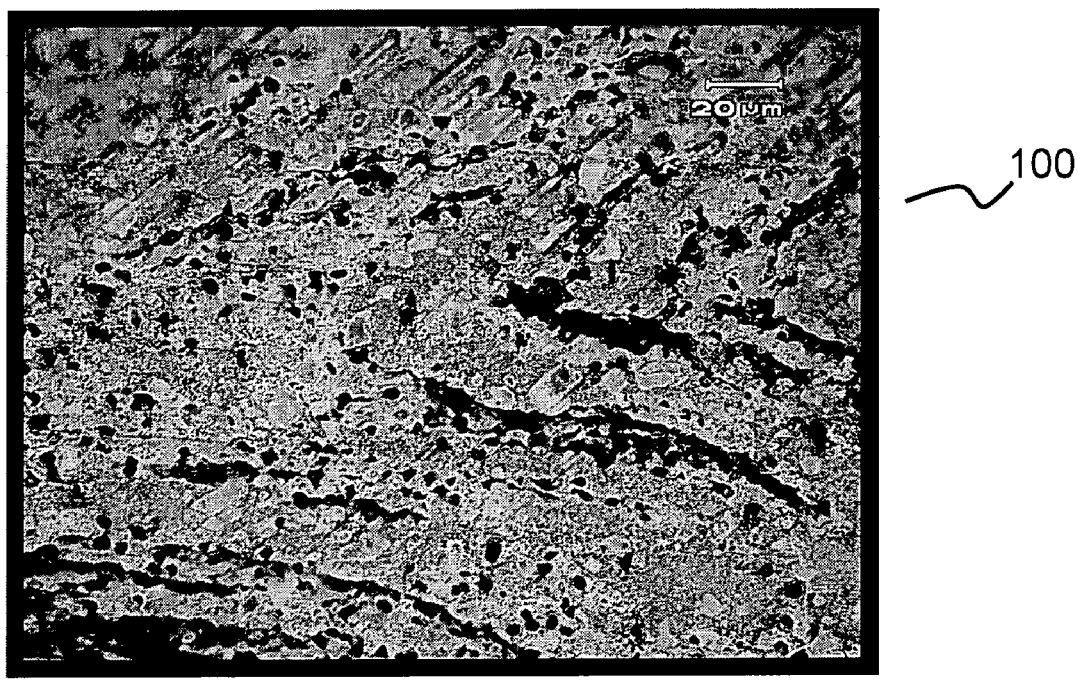
FIG. 7 is a cross-sectional view of the microstructure of the steel of FIG. 6.

FIG. 7 is a cross-sectional view of the microstructure of the steel member 100. The figure shows that the diamond particles 102 are present throughout the mixed region of the steel member 100.

Figure 8:
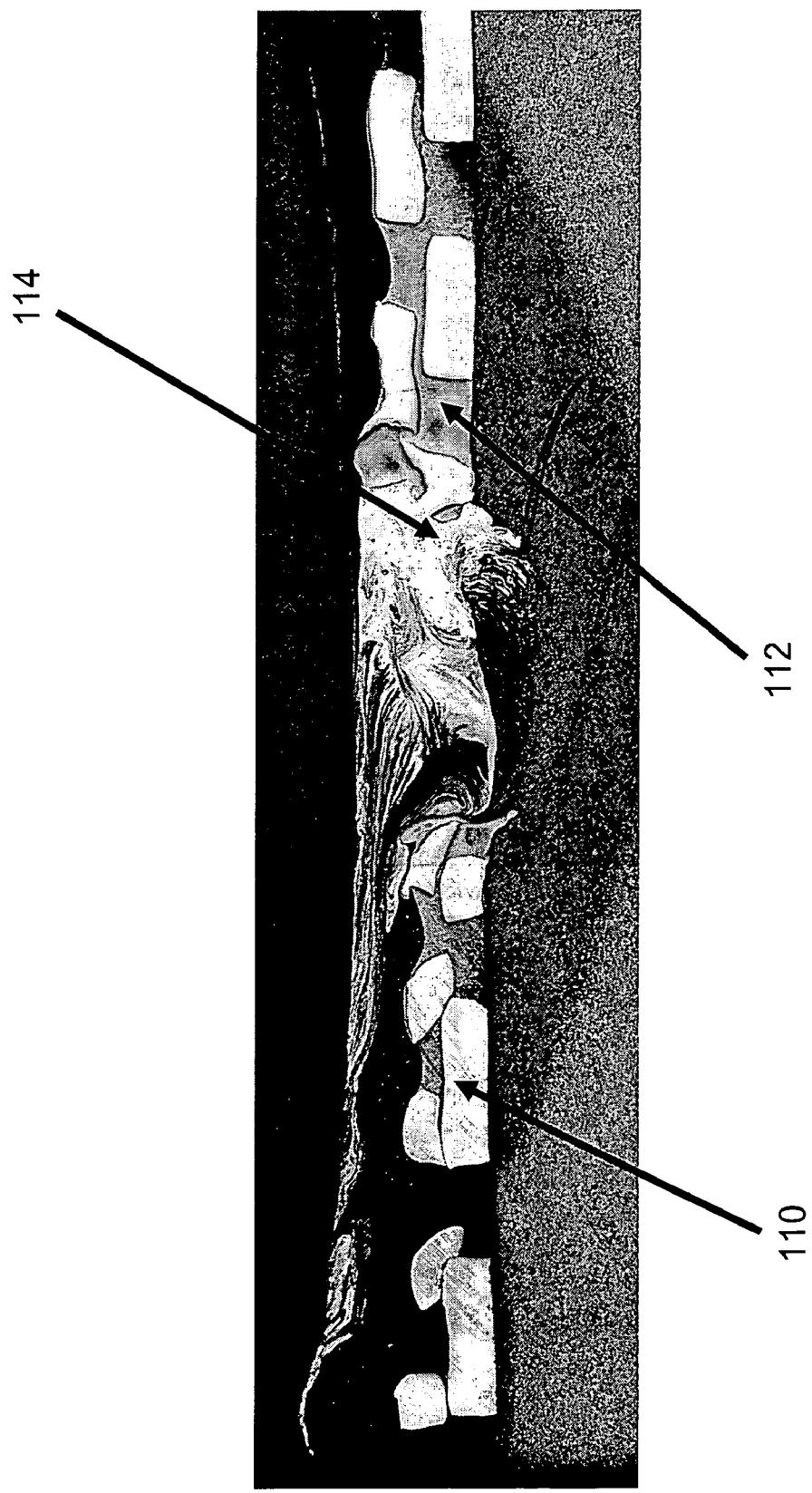
FIG. 8 is a cross-sectional view of one embodiment for friction stir mixing an additive material 112 into another using a mesh or screen 110 to hold the additive material 112 in place.

FIG. 8 is a cross-sectional view of one embodiment for friction stir mixing an additive material 112 into another using a mesh or screen 110 to hold the additive material 112 in place. Specifically, a stainless steel mesh or screen 110 is being used to hold carbide 112 in the form of a powder. The screen 110 and carbide powder 112 are disposed on the surface of a base material 114. The surface of the base material 114 is then friction stir processed, resulting in a mixing of the stainless steel 110, the carbide 112, and the base material 114 at the surface of the base material. Alternatively, the different materials could be mixed further into the base material 114 using a tool having a pin, or by using a tool having a shoulder that is pressed harder into the base material.

Figure 9:
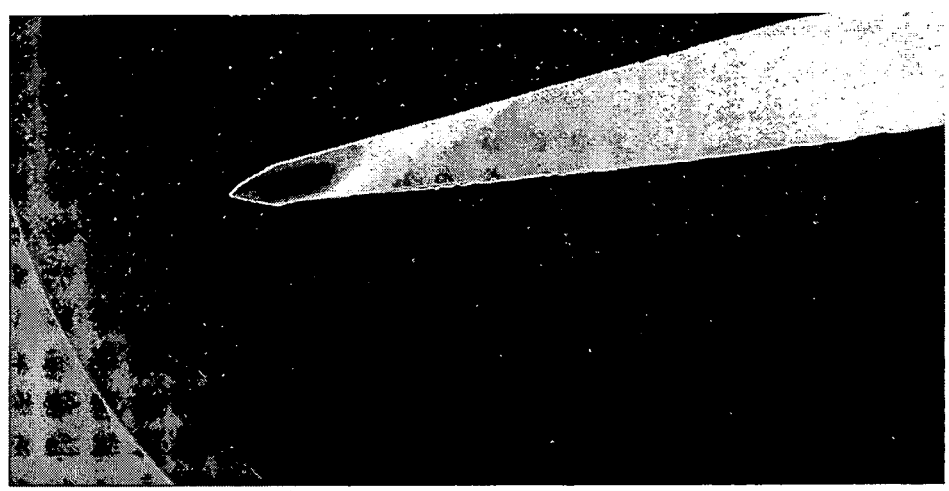
FIG. 9 is an image of a friction stir processed region of a hand-held knife blade.

FIG. 9 is a close-up view of a hand-held knife blade that was created in accordance with the process described below.

Figure 10:
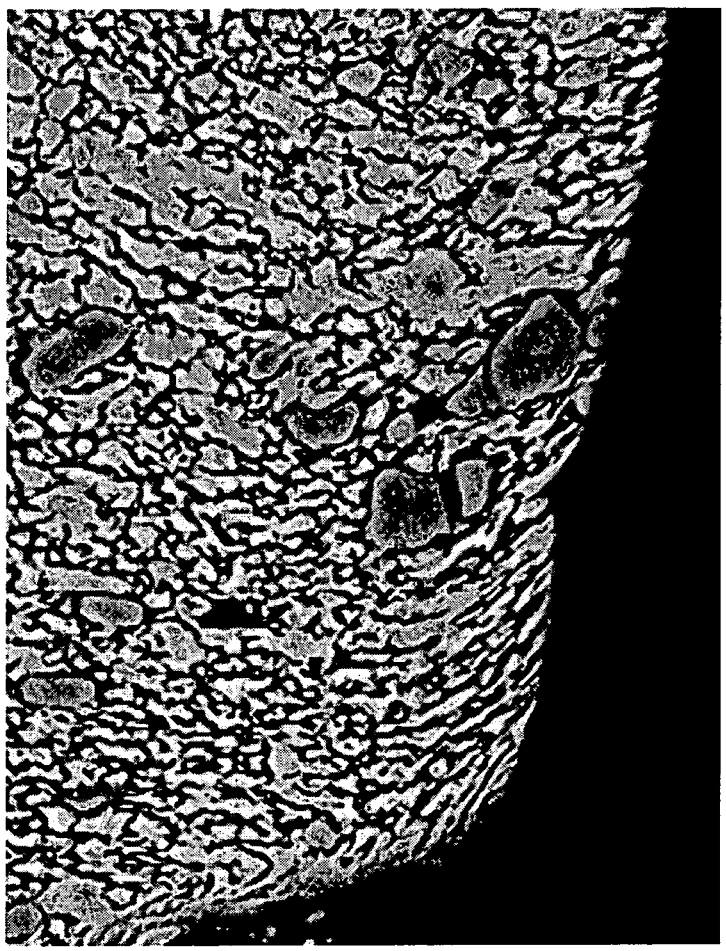
FIG. 10 is an image of the microstructure of the hand-held knife blade of FIG. 9.

FIG. 10 is a view of the microstructure of the hand-held knife blade of FIG. 9.

An important concept of the present invention is that solid state processing or friction stir processing that is performed is a temporary transformation into a plasticized state. Thus, the material that is used as the workpiece and formed into the hand-held knife blade does not pass through a liquid state.

The balance of this document is devoted to test results for comparisons that achieved unexpected results. For comparison purposes, a Brown Bear™ hand-held Cleaver blade formed of D-2 steel was bolted to a test handle. A hand-held test blade having a cutting edge formed of friction stir processed D-2 steel ground to an identical profile was also prepared and bolted to a handle in a similar manner. The resulting hand-held cleaver blade and hand-held test blade were both 24 ounce blades that provided ample weight and inertia for chopping.

A first chopping test was performed on a green red oak limb; a second chopping test was performed on a dried Osage orange limb, which is an extremely hard, dense wood; a third chopping test was performed on an elk antler (bone); a fourth chopping test was performed on a brick block, and a fifth chopping test was performed on a steel anvil. Results for chopping with the test blade are as follows in Table 1:

TABLE 1

| Test | Result |
| --- | --- |
| Green red oak | No edge chipping; edge will still shave dry hair |
| Dried Osage Orange | No edge chipping; edge will still shave dry hair |
| Elk antler | No edge chipping; minor edge wear evident; would shave wet hair |
| Brick | Edge damage evident with several small chips and dulled edge |
| Steel anvil | Small edge separation at point of machining groove for friction stir |

Both hand-held cleavers were able to consistently cut through bone and hard wood without chipping. However, the hand-held test blade was found to provide greater edge retention over the conventional hand-held cleaver.

Figure 16:
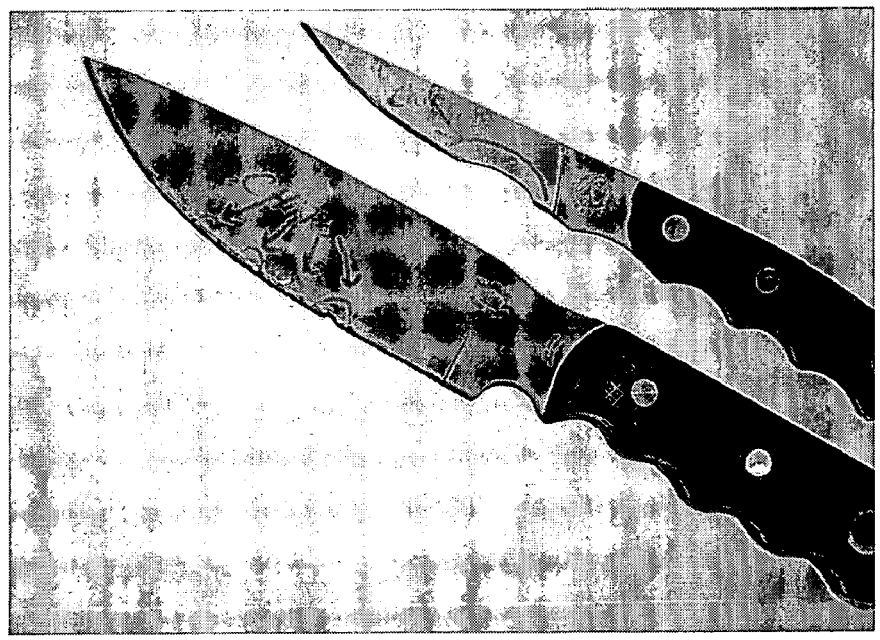
FIG. 16 shows fractured edge of Knives of Alaska knives after cutting elk antler.
Figure 17:
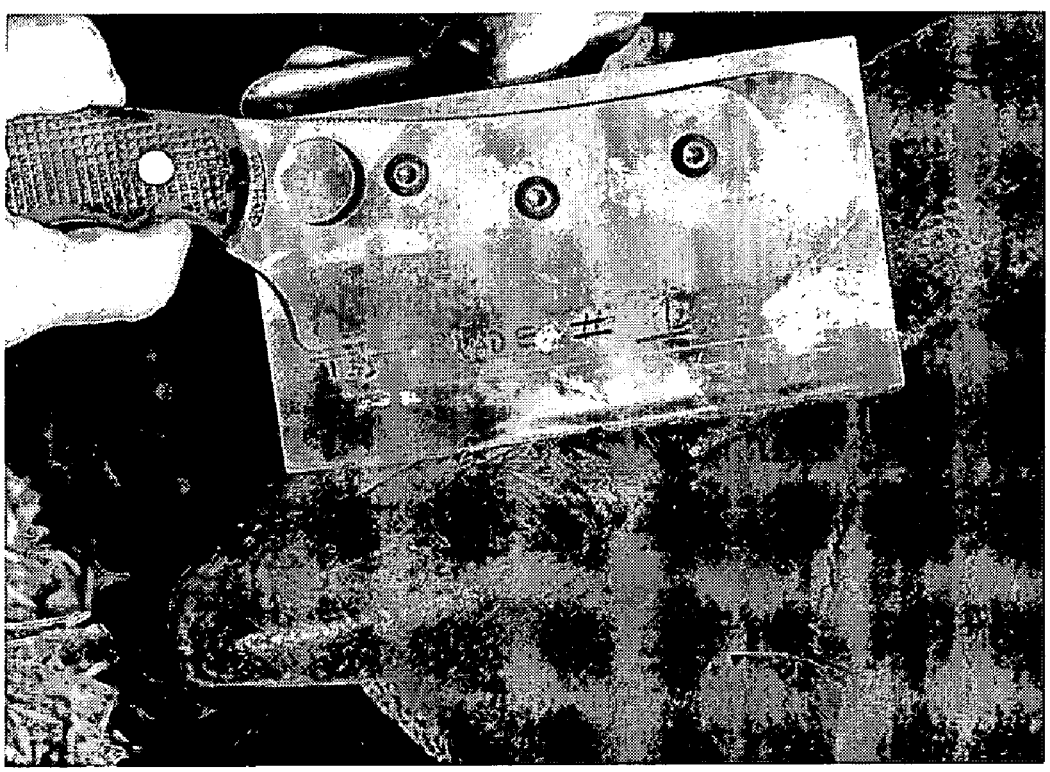
FIG. 17 shows anvil being chopped.

The above tests were also performed using a hand-held Bush™ Camp Knife and a hand-held Jaeger™ Boning knife which both have good edge retention when compared to other hand-held knives. As shown in FIG. 16, both hand-held knives had catastrophic cutting edge failures when tested on the elk antler and, thus, were not tested on the harder materials.

A second hand-held test blade was sharpened to perform new tests. The second test blade was used to cut rope for 30 minutes. In that time, 607 cuts were made until the rope was gone. The second hand-held test blade still shaved dry hair afterwards.

Further tests were performed on hand-held test blades, such as the sharpness test of the friction stir processed edge. For this test, five different Knives of Alaska™, Inc. hand-held knife models were first tested. These hand-held knives include the Alaskan Brown Bear Skinner/Cleaver (D2 steel; RC 55-57), the Jaeger Boning Knife (ATS-34 steel; RC 59-61), the Bush Camp Knife (AUS8 steel; RC 57-59), the Coho fisherman's knife (hollow ground AUS8 steel; RC 57-59), and the Magnum Ulu (D2 steel; RC 59-61). The final test was on a hand-held test blade with the friction stir processed edge.

Figure 12:
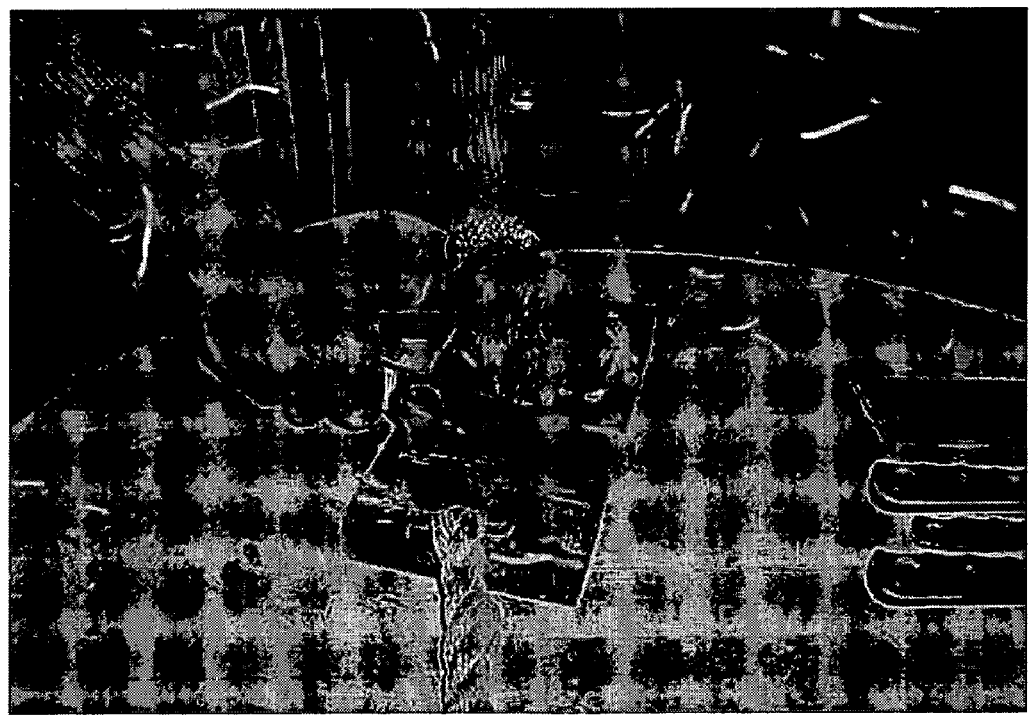
FIG. 12 shows a Brown Bear Cleaver striking rope with particles flying.
Figure 13:
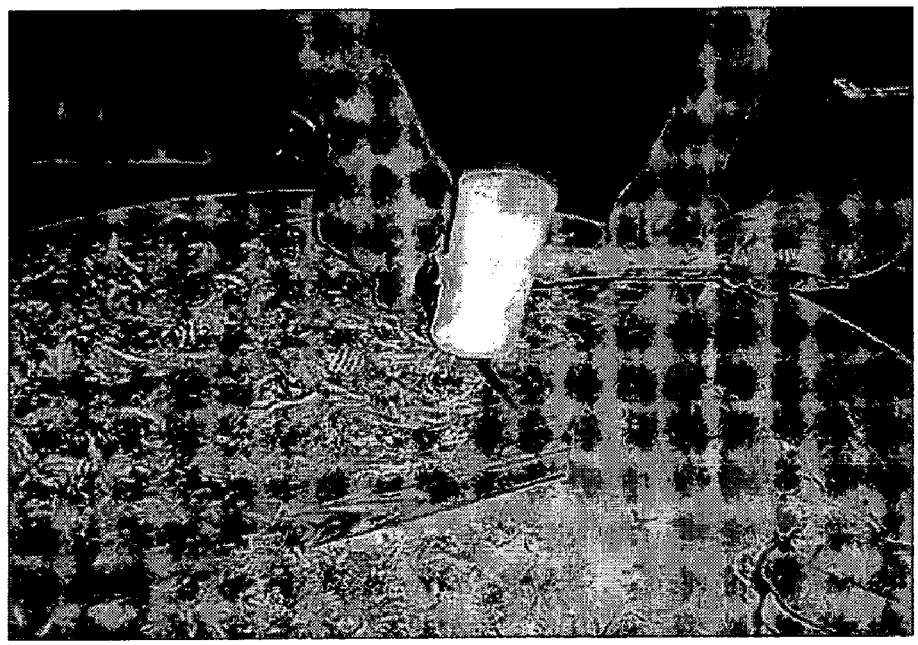
FIG. 13 shows hammer strike on blades.
Figure 14:
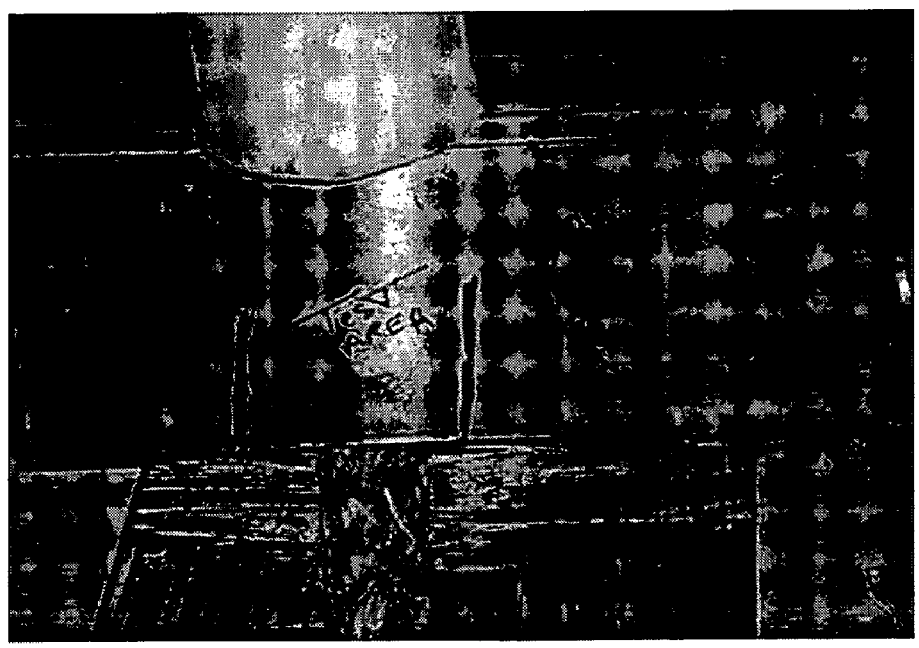
FIG. 14 shows hammer strike on hand-held test blade illustrating test area and where each of the 100 cuts occurred.

The test for sharpness involved placing a ¾ inch thick hemp rope on a 2×6 board. A section on each knife was selected and the rope was cut completely through by striking the back of the blade with a soft mallet. FIG. 12 shows a Brown Bear cleaver striking the rope. FIG. 13 shows a mallet or hammer that was used to strike the hand-held blades to cause them to cut through the rope. FIG. 14 shows the area on the hand-held test blade where the rope was repeatedly.

The rope was repeatedly cut, at the same point on the hand-held knife blade. The number of cuts was recorded for each hand-held blade. When the hand-held knife's tested section would no longer shave dry hair on the tester's arm—this was recorded as one past the maximum number of cuts that that hand-held blade steel would retain a shaving edge. The test results are as follows as shown in Table 2:

TABLE 2

| Hand-held Knife | Number of Cuts Where hand-held Knife No Longer Shaves |
| --- | --- |
| Alaskan Brown Bear | 17 |
| Jaeger Boning Knife | 67 |
| Bush Camp Knife | 41 |
| Coho Fisherman's Knife | 14 |
| Magnum Ulu | 52 |
| Test Blade | 100+ |

Figure 15:
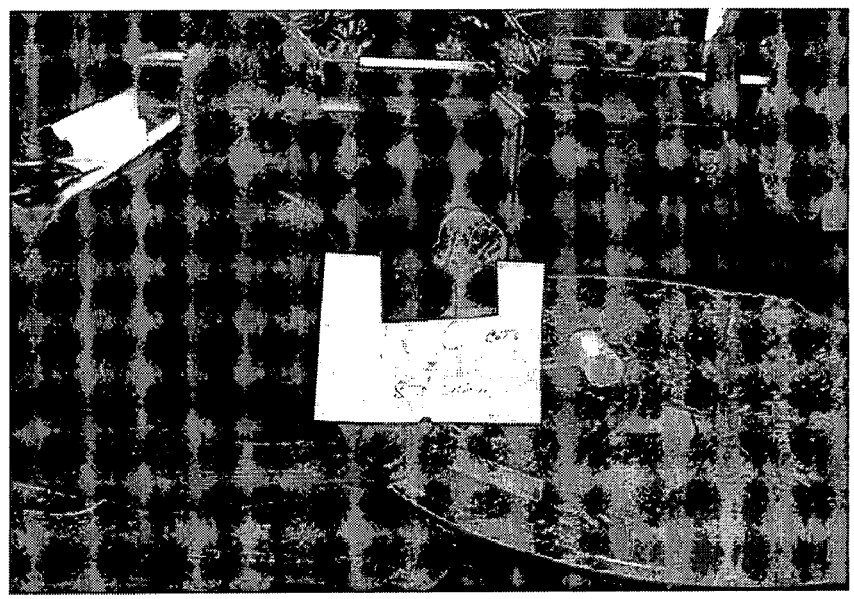
FIG. 15 shows 100 cuts by hand-held test blade and still shaving sharp.

It is observed that the testing of the hand-held test blade was stopped at 100 cuts as the hand-held test blade was already exceeding all other test samples. The hand-held test blade is shown in FIG. 15. Furthermore, the hand-held blade would still shave and there was no appreciable difference between the edge when the testing began and after 100 cuts.

The test blades formed in accordance with the present invention held up to and exceeded expectations in the sharpness category and in the impact test results. Conventionally, it is unexpected to be able to take a two pound hand-held test blade and swing it smartly to cut through a hard material such as elk antler, repeatedly, and still retain a shaving edge with no edge fracturing. Such performance is unheard of in the hand-held knife industry.

Friction stir processing may be applied to any hand-held knife blade to enhance performance characteristics of the blades. Such hand-held knife blades may be formed of any material known in the art, including D2 steel, ATS-34 steel, AUS8 steel, S-30V steel, or other materials.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for creating a metallic blade for a hand-held knife, said method comprising the steps of:
   1) providing a high melting temperature metallic workpiece that is to be formed into a hand-held knife blade;
   2) providing a friction stir processing tool that includes a higher melting temperature material than the base material on a portion thereof; and
   3) friction stir processing at least a portion of the workpiece using the tool to thereby modify characteristics thereof, wherein the friction stir processing includes modifying a microstructure of the workpiece and friction stir mixing diamond particles into the workpiece to produce a friction stir processed region; and
   4) forming the blade of the hand-held knife blade from the workpiece, such that a cutting edge of the blade is formed within the friction stir processed region of the workpiece such that the edge will resist fracturing on the edge after repeated impacts thereon while also retaining a shaving sharpness, and wherein the edge will retain these characteristics longer than an edge on a conventional blade unmodified by friction stir processing which exhibits an inverse relationship between impact resistance and toughness in comparison to wear resistance and hardness.

2. The method as defined in claim 1 wherein the method further comprises the step of causing a substantially solid state transformation without passing through a liquid state of the base material.

3. The method as defined in claim 1 wherein the step of providing the high melting temperature base material includes selecting the high melting temperature base material from the group of high melting temperature materials including ferrous alloys, non-ferrous materials, superalloys, titanium, cobalt alloys typically used for hard-facing, and air hardened or high speed steels.

4. The method as defined in claim 1 wherein the method further comprises the step of synthesizing a new material from solid state processing of the workpiece, wherein the new material has characteristics that are advantageous to a hand-held knife blade.

5. The method as defined by claim 1 wherein the method further comprises the step of modifying a macrostructure of the workpiece.

6. The method as defined in claim 5 wherein the step of modifying the microstructure includes increasing toughness of the base material.

7. The method as defined in claim 5 wherein the step of modifying the microstructure includes increasing or decreasing hardness of the base material.

8. The method as defined in claim 5 wherein the step of modifying the microstructure includes increasing or decreasing strength of the workpiece.

9. The method as defined in claim 5 wherein the step of modifying the microstructure includes friction stir processing the workpiece to thereby obtain superior edge retention on the hand-held knife blade that is formed therefrom.

10. The method as defined in claim 5 wherein the step of modifying the microstructure includes friction stir processing the workpiece to thereby obtain superior resistance to chipping on the hand-held knife blade that is formed therefrom.

11. The method as defined in claim 1 wherein the step of providing the friction stir processing tool further includes the step of providing the friction stir processing tool having a shank, a shoulder and a pin.

12. The method as defined in claim 11 wherein the step of providing the friction stir processing tool having a shank, a shoulder and a pin further comprises the step of including a superabrasive material.

13. A method for creating a metallic blade for a hand-held knife, said method comprising the steps of:
   1) providing a high melting temperature metallic workpiece that is to be formed into a hand-held knife blade;
   2) providing a friction stir processing tool that includes a higher melting temperature material than the base material on a portion thereof, the friction stir processing tool having a shank, a shoulder and a pin;
   3) friction stir processing using the tool to thereby modify characteristics thereof using a surface area of the pin to process at least a portion of the surface of the workpiece without plunging the pin into the workpiece; and
   4) forming the blade of the hand-held knife blade from the workpiece, such that an edge of the blade is formed in the at least a portion of the workpiece that has been friction stir processed such that the edge will resist fracturing on the edge after repeated impacts thereon while also retaining a shaving sharpness, and wherein the 'edge will retain these characteristics longer than an edge on a conventional blade that is not modified using friction stir processing.

14. The method as defined in claim 1 wherein the step of providing the friction stir processing tool further includes the step of providing the friction stir processing tool having a shank and a shoulder.

15. The method as defined in claim 13 wherein the method further comprises the step of causing a substantially solid state transformation without passing though a liquid state of the base material.

16. The method as defined in claim 13 wherein the step of providing the high melting temperature base material includes selecting the high melting temperature base material from the group of high melting temperature materials including ferrous alloys, non-ferrous materials, superalloys, titanium, cobalt alloys typically used for hard-facing, and air hardened or high speed steels.

17. The method as defined in claim 13 wherein the method further comprises the step of synthesizing a new material from solid state processing of the workpiece, wherein the new material has characteristics that are advantageous to a hand-held knife blade.

18. The method as defined in claim 1 wherein friction stir mixing diamond particles into the workpiece to produce a friction stir processed region further comprises mixing carbide powder into the workpiece.

* * * * *

UNITED STATES PATENT AND TRADEMARK OFFICE
CERTIFICATE OF CORRECTION

| | | |
|---|---|---|
| PATENT NO. | : 8,186,561 B2 | |
| APPLICATION NO. | : 11/090909 | |
| DATED | : May 29, 2012 | |
| INVENTOR(S) | : Charles E. Allen et al. | |

It is certified that error appears in the above-identified patent and that said Letters Patent is hereby corrected as shown below:

On the title page of the patent Item 73 under the Assignee Information, the language -- Diamond Blade, LLC Denison, TX (US) -- should be inserted after the language -- Megastir Technologies, LLC Provo, UT (US) --.

Signed and Sealed this
Twenty-sixth Day of June, 2012

David J. Kappos
*Director of the United States Patent and Trademark Office*